United States Patent [19]

Warszawski

[11] 4,317,867
[45] Mar. 2, 1982

[54] ELECTRODE FOR AN ELECTRIC CELL

[75] Inventor: Bernard Warszawski, Paris, France

[73] Assignee: Societe Generale de Constructions Electriques et Mecaniques "Alsthom & Cie", Paris, France

[21] Appl. No.: 196,680

[22] Filed: Oct. 14, 1980

[30] Foreign Application Priority Data

Oct. 18, 1979 [FR] France ................ 79 25879

[51] Int. Cl.³ .......................................... H01M 4/86
[52] U.S. Cl. ........................................ 429/42; 429/40
[58] Field of Search .................... 429/42, 40, 178; 252/503, 502, 514

[56] References Cited

U.S. PATENT DOCUMENTS

| 3,553,022 | 1/1971 | Gregory | 136/86 |
| 3,733,221 | 5/1973 | Sandler et al. | 136/120 FC |
| 4,091,176 | 5/1978 | Alfenaar | 429/42 X |
| 4,104,197 | 8/1978 | Heffler | 252/425.3 |

FOREIGN PATENT DOCUMENTS

| 2215710 | 8/1974 | France . |
| 2258007 | 8/1975 | France . |
| 2344969 | 10/1977 | France . |

Primary Examiner—Charles F. Lefevour
Attorney, Agent, or Firm—Kenyon & Kenyon

[57] ABSTRACT

A porous electrode for an electric cell, said electrode including a support layer and an active or catalytic layer, the thickness of the electrode (1a, 1b, 1c, 1d) lying between about 50 and 600 microns and preferably between 100 and 250 microns, the active or catalytic layer (2) and the support layer (3) each including 60 to 99% by weight of a hydrophobic polymer or binder and 40 to 1% by weight of a carbon-based divided conductive compound the two layers being, in the aggregate, hydrophobic and intimately joined, current being drawn off at points or lines which are spaced apart by a distance of about one millimeter from one another by an electronically conductive collector (4) in contact at the points or lines with the support layer (3).

17 Claims, 1 Drawing Figure

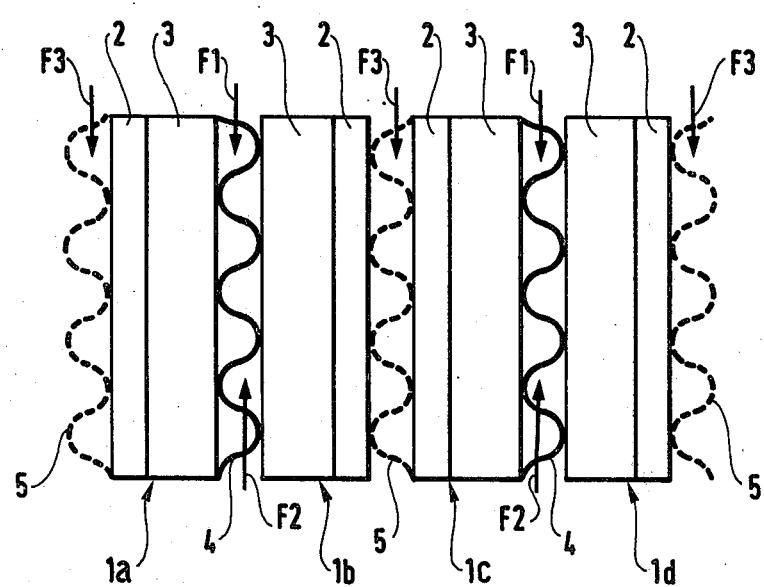

ELECTRODE FOR AN ELECTRIC CELL

BACKGROUND OF THE INVENTION

The present invention relates to an electrode for an electric cell and in particular for a fuel cell using a liquid electrolyte and designed to consume a first oxidizing agent gas such as oxygen or atmospheric air, for example, and a second reducing agent gas such as hydrogen. It applies in particular to a filter-press type cell such as described in U.S. Pat. No. 4,002,493, for "A fuel cell structure and system, more particularly for a carbon fuel and atmosphere air".

In such a cell, current is transferred between neighbouring electrodes belonging to two adjacent cells by means of electronically conductive impermeable corrugated current collectors which are in contact with the electrodes. Contact may be maintained by simple pressure or by bonding at points of contact or along lines at a spacing of about one millimeter.

Further, the impermeable structure of such bipolar collectors cooperates with each electrode to define passages for the corresponding reactive gas, with the passages as a whole constituting the gas compartment of said electrode.

Each fuel cell electrode must include at least one porous layer (here referred to as a catalytic or active layer) having one free surface in contact with the electrolyte and fed with a reagent gas via its outer surface. More precisely, the catalytic layer must be able to promote the electrochemical process and for this purpose it must be sufficiently porous to form a liquid-gas interface between the electrolyte which enters via the wetted surface and the reagent gas which arrives via the other surface. Reaction takes place at the line of contact (referred to as the "triple line") between the gas-electrolyte interface and the surface of the porous layer. The electrode must also include—at least in the vicinity of the triple line—an electrocatalyst capable of catalysing the oxidation or the reduction reaction, as the case may be, of the reagent gas. The electrocatalyst is in contact with an electron conductor which is itself in continuous electrical connection with the current collector means which serve to transport the electrons which are produced or consumed in the reaction.

A catalytic layer therefore generally includes: a catalyst, an electron conductor (in the majority of cases, a metal or carbon) and, when neither the catalyst nor the electron conductor forms a continuous solid, a binder which, in most cases, is hydrophobic.

In prior art electrodes, to maximize the extent of the triple line, it was sought to make the liquid electrolyte enter the catalytic or active layer. To do this, the materials used for said layer were compounds which made it, in the aggregate, absorbent or, more precisely, wettable; when the binder was hydrophobic, this was achieved by using a sufficiently small quantity of binder relative to the quantities of other, absorbent, materials used in the layer. Generally, less than 50% of the layer as a whole constituted binder, and in most cases less than 40% and even less than 30%. This is the case, for example, of the catalytic layer described in U.S. Pat. No. 3,553,022 issued on 5th January, 1971, in which the catalytic layer may thus include 30% by weight of polytetrafluoroethylene which acts as a binder and 70% of platinum which acts as a catalyst.

However, with a catalytic or active layer which, in the aggregate, is wettable, the electrolyte finally enters completely and soaks the layer throughout, thereby preventing the reagent gas from entering, and consequently causes the triple line to disappear completely. To remedy this situation in prior art electrodes, a second porous layer is associated with the catalytic layer on the gas side, said second porous layer generally being referred to as a barrier layer and having the property of preventing electrolyte from entering its pores because the barrier layer is hydrophobic. Hence, the liquid-gas interface is stabilized at the interface between the two layers.

The barrier layer must be porous enough to allow reagent gases such as hydrogen or air to reach the catalytic layer by diffusion, while nevertheless preventing the electrolyte from flowing in the opposite direction towards the gas compartment of the electrode; however, it must also allow electron transfer between the catalytic layer and the collector.

To do this, such a macroscopically homogeneous layer must therefore include a material which is hydrophobic and therefore electronically insulative together with an electronically conductive material. The two essential functions of such a barrier layer therefore appear to be in contradiction with each other: if the hydrophobic material content is high, the electron conductivity is low and therefore so is performance; if the conductive material content is high, the material is insufficiently hydrophobic and this causes relatively rapid penetration of electrolyte and therefore a short service life.

In known electrodes, it is impossible to solve such a contradiction. Therefore, to overcome such disadvantages, electrodes have been made which include, in addition to the catalytic layer, a barrier layer with a high content of hydrophobic binder or a barrier layer which contains only hydrophobic binder, said electrodes also including an extra component of low binder content or constituted even by electronically conductive material only so that the electrode has sufficient electron conductivity to compensate for the poor conductivity of the hydrophobic layer. These electrodes therefore include, for example, a mesh or an expanded metal part, a graphite or carbon fabric, etc., imbricated in the barrier layer and/or in the catalytic layer, for example.

However, such known electrodes have a number of drawbacks.

Firstly, their complexity makes them thick, which results in bulky electric cells. Further, these electrodes are rather rigid because of their third conductive material content. This makes them mechanically fragile especially in filter-press type structures, such as in the above-described U.S. Pat. No. 4,002,493, and gives rise to interconnection difficulties in said structures.

Even in the case where these electrodes have only two layers, the fact that the catalytic layer, which is hydrophilic and therefore has a relatively low binder content, makes it particularly fragile and likely to fracture when the electrode is being handled and when it is subjected to mechanical or thermal strains and stresses, etc., during assembly of the cell and during operation, thus increasing the cost of the cell and shortening its service life.

In the case where a third component is provided e.g. a carbon fabric within which the catalytic layer is contained, said catalytic layer causes the electrode to be heterogeneous, which can give rise to a lack of cohesion in the electrode during operation, in particular because of the different coefficients of expansion of the binder and the material which constitutes the third component. Further, the hydrophilic nature of the carbon fabric, which is also in contact with the barrier layer, gives rise to conditions of particularly rapid inhibition in the active and barrier layers in the neighbourhood of their interface. This considerably shortens the service life of the electrode. It must also be observed that since the active layer takes up only the empty spaces between the meshes of the third component, the effective current density which the active layer transports is clearly higher than the apparent average current density. This increases polarization and reduces the service life of the electrode.

Further, the appreciable thickness of known electrodes requires them to have a highly porous structure which, in general, must be produced by pore-forming products during electrode manufacture. Subsequent removal of said products may be incomplete and the products may give rise to a heterogeneous structure. There is also a danger of thereby forming macroporosities which are liable to alter the operation of the electrode e.g. by promoting electrolyte weeping.

Lastly, such electrodes turn out to be relatively difficult to produce, especially on an industrial scale, and therefore their cost price is high.

Preferred embodiments of the present invention mitigate the above-mentioned drawbacks, particularly by providing electrodes whose service life is appreciably increased relative to that of prior art electrodes.

SUMMARY OF THE INVENTION

The invention provides a porous electrode for an electric cell, said electrode including a support layer and an active or catalytic layer, wherein the electrode comprises exclusively the aforementioned active or catalytic layer and support layer, the thickness of said electrode lying between about 50 and 600 microns and preferably between 100 and 250 microns, the active or catalytic layer and the support layer each including 60 to 99% by weight of a hydrophobic polymer or binder and 40 to 1% by weight of a carbon-based divided conductive compound said two layers being, in the aggregate, hydrophobic and intimately mixed, current being drawn off by points or by lines which are spaced apart by a distance of about one millimeter from one another by means of an electronically conductive collector in contact with said support layer.

An electrode in accordance with the invention is of simple structure, is thin and flexible, and can be produced at a continuous industrial rate in the form of very long strips and at minimum cost. It can also be used to obtain high power at high electrochemical efficiency.

DETAILED DESCRIPTION OF THE PREFERRED EMBODIMENT

The Applicant observed, during research—and this was unexpected—that it was possible to overcome the drawbacks of prior electrodes by forming an electrode with a maximum of two layers, namely a support layer and an active or catalytic layer having a total thickness of less than 1 mm, and by ensuring that each of the layers (which are both essentially constituted by a binder and divided carbon) have a very high proportion of hydrophobic binder, with substantially the same proportion in both. These requirements impart simultaneously to the electrode: (a) a quality which, in the aggregate, is hydrophobic; (b) high structural cohesion, (c) mechanical and thermal properties which are almost identical, as well as high adherence between the two layers—an adherence which may even result in the formation of a continuous network of binder spanning both layers.

In addition to the properties hoped for as a result of this construction, namely: simplicity of manufacture; structural cohesion; aptitude to withstand deformation, handling, friction and mechanical stresses of any kind without damage; and the capacity of expanding and contracting when heated or cooled without coming apart and without the appearance of damage such as cracks; the electrode in accordance with the invention also has the following unexpected properties:

(a) despite the relatively low conductivity of the support layer (due to the high proportion of binder relative to the divided conductive carbon) the electrode can deliver current densities of up to several hundreds of milliamps per square centimeter with an acceptable ohmic drop, when used in conjunction with means for drawing off the current from the surface of said layer by contact points or by lines which are spaced apart at a distance of about one millimeter;

(b) the service life of the electrode is considerably increased relative to an electrode in which the active or catalytic layer is, in the aggregate, wettable. A possible explanation is that, at the beginning of the electrode operation period the liquid-gas interface, instead of being located at the interface between the catalytic layer and the support layer (which then performs the function of a barrier layer), is now located in the catalytic layer in the neighbourhood of its surface which is in contact with the electrolyte. The inevitable migration of said liquid-gas interface towards the surface of the electrode which is exposed to the gas can therefore take place over a very long period of time without reducing the thickness of the reaction zone, which retains its original size as it moves, whereas the same reaction zone is reduced by such migration when the liquid-to-gas interface is originally located as in prior art electrodes;

(c) the support layer is remarkably resistant to the passage or weeping of electrolyte towards the gas compartment, even when there is a high over-pressure of electrolyte relative to the gas; this occurs regardless of the specific size of the pores in the support layer. Again, it is believed that the support layer, which no longer performs the function of a barrier layer in the same way as in prior art electrodes due to the new location of the gas-liquid interface, needs to block only a few streams of liquid which, because of possible local defects in the active or catalytic layer, may even pass right through said layer, and that the hydrophobic quality of said layer alone is sufficient for this purpose;

(d) bringing reactive gas into the reaction zone by diffusion suffices to provide a current density of several hundreds of milliamps per square centimeter without it being necessary to use a pore-forming agent to impart a given porosity to either of the layers; even low porosity produced naturally by mixing components of the layers appears sufficient.

Therefore, as already mentioned, a high binder content in both layers of the electrode helps to obtain a coherent electrode which can thermally expand and contract cyclically without damage and which can undergo numerous handling, bending and folding operations as well as standing up to friction, abrasion, etc.;

its thinness makes it extremely flexible, thereby facilitating assembling in electric cells.

DETAILED DESCRIPTION OF THE PREFERRED EMBODIMENT

Other characteristics and advantages of the invention become apparent from the following description given by way of example, with reference to the sole FIGURE of the accompanying drawing, which shows in schematic form a cross-section of a fuel cell using electrodes according to the invention.

The electrode in accordance with the invention includes only two layers, namely, an active or catalytic layer and a support layer, whose functions are outlined hereinabove.

The thickness of the catalytic layer is of the order of 5 to 100 microns and preferably 20 to 50 microns, while that of the support layer may vary between 45 and 500 microns and preferably 100 to 200 microns, the layers being thin in all cases. Therefore, the total thickness of the electrode lies between 50 and 600 microns and preferably between 100 and 250 microns.

Further, these two layers include 60 to 99% of binder or hydrophobic polymer such as polytetrafluoroethylene (PTFE), polypropylene, polyvinyl chloride etc. (and preferably PTFE), the remainder being carbon in divided form for the support layer, and carbon in the divided form impregnated with a catalyst or associated with a catalyst in the case of the active or catalytic layer.

By way of example, the porosity of such layers may vary between 10 and 80%, and their electrical resistivity can vary between 0.04 and 1 ohm. cm.

In spite of the thinness and the low porosity of electrodes in accordance with the invention, it surprisingly turns out to be possible to provide a sufficient quantity of reagent gas to enable current densities of about 300 mA/cm$^2$ to be obtained for hydrogen and about 200 mA/cm$^2$ to be obtained for air.

Advantageously, such an electrode is manufactured by using one of the methods described in the commonly-assigned copending U.S. applications Ser. No. 196,681 for "A method of manufacturing thin porous strips by calendering and strips so obtained, in particular electrodes for fuel cells" and Ser. No. 196,631 "A method of continuous manufacturing thin porous strips and strips so obtained, particularly electrodes for fuel cells" filed on the same date as the present application.

In the first of these applications, such strips and in particular electrodes for fuel cells are obtained by passing material which constitutes said strips between the rolls of a calender, said material being in the form of a powdered mixture of carbon and a binder free from any pore-forming product, calendering being carried out substantially at ambient temperature.

Strips, and in particular multi-layer electrodes, are formed by calendering at least two strips together.

In the second of these applications, such strips, and in particular electrodes for fuel cells, are formed by spreading an aqueous dispersion of graphite or carbon fibres and of particles of a binder, in the form of a layer, and by removing the water and giving the layer the required thickness, such a thickness possibly being less than a few tens of microns.

To produce multi-layer strips and in particular electrodes, the dispersions are spread one on another before the water is removed.

Besides the above-mentioned advantages, it will be observed that the lack of pore-forming products when forming electrodes in accordance with the invention leads to pores being obtained which are constituted by the interstices of the stack of particles of the starting carbon-binder mixture. Therefore, despite the thinness of the layers, there is no danger of producing detrimental macroporosities and the structure is macroscopically homogeneous.

Electrodes in accordance with the invention can therefore easily be integrated in fuel cell structures of the filter-press type, for example of the type described in the above-mentioned U.S. Pat. No. 4,002,493 in which the current can be collected by means of collectors with points or lines of contact situated a few millimeters apart, e.g. by a corrugated bipolar collector as mentioned hereinabove.

Generally, such a collector can be made of any conductive material; advantageously, it can be formed by a sheet of plastic material, e.g. polypropylene, impregnated with conductive powders or fibres, in particular carbon powders or fibres or mixtures of both. The contact between the collector and the electrode is provided either by pressure or, preferably, by bonding (e.g. welding) or by glueing with a conductive glue, preferably an epoxy resin impregnated with carbon pwoder. Indeed, it is observed that bonding or glueing ensure that the quality of the contact is permanently maintained despite the expansion and contraction of the structure caused by starting and stopping heat cycles, plastic materials creep, etc.

The accompanying FIGURE therefore schematically illustrates a fuel cell of the filter-press type in which electrodes in accordance with the invention are used.

For clarity in the drawing, the thickness of the electrodes has purposely been greatly exaggerated.

Such a cell therefore includes electrodes 1a, 1b, 1c, 1d ... such as previously described, each of which has an active or catalytic layer 2 and a support layer 3.

The electrodes 1a and 1b and the electrodes 1c and 1d are in contact with a corrugated collector 4 made of metal or conductive plastic by means of their support layers 3. Arrows F1 and F2 represent the supply of fuel and of oxidant respectively.

Further, the electrodes 1b and 1c are kept in contact with the electrolyte and a porous corrugated membrane 5 by means of their active or catalytic layers 2, arrow F3 representing the electrolyte supply. Similarly, the electrode 1a and the preceding electrode (not shown) as well as the electrode 1d and the following electrode (not shown) are kept mutually in contact by means of their active or catalytic layers 2 with a membrane 5, and so on.

Such an assembly is then clamped to constitute a filter-press type structure.

A precise example of an electrode in accordance with the invention is given hereinbelow.

|  | Thickness in microns | Porosity (%) | Carbon (%) | PTFE (%) |
| --- | --- | --- | --- | --- |
| Support layer | 200 | 30 | 18 | 82 |
| Active or catalytic layer | 50 | 30 | 40 | 60 |

The carbon used in the catalytic layer has 20% by weight of platinum deposited on it.

The carbon is either "Vulcan XC 72" made by Messrs. Cabot or "Ketjen black" carbon black made by Messrs. Azko. An active carbon such as "BRX" made by Messrs. Norit can also be used for the active or catalytic layer.

Advantageous applications are found for the invention in fuel cells powered by reagent gases of the hydrogen-air or menthanol-air type for example.

I claim:

1. An electrode-collector assembly for an electric cell, said assembly comprising:
    a porous electrode consisting of two layers, an active or catalytic layer and a support layer, the total thickness of said electrode being between about 50 and about 600 microns, the active or catalytic layer and the support layer each comprising 60 to 99% by weight of a hydrophobic binder and 40 to 1% by weight of a carbon-based divided electrically conductive composition, and said two layers being hydrophobic in the aggregate and intimately bonded, and
    an electronically conductive collector in contact with said support layer at points or lines which are spaced apart by a distance of about 1 mm.

2. An electrode-collector assembly according to claim 1, wherein the thickness of said active or catalytic layer is between about 5 and about 100 microns.

3. An electrode-collector assembly according to claim 2 wherein the thickness of said active or catalytic layer is between about 20 and about 50 microns.

4. An electrode-collector assembly according to claim 1, wherein the thickness of said support layer is between about 45 and about 500 microns.

5. An electrode-collector assembly according to claim 4 wherein the thickness of said support layer is between about 100 and about 200 microns.

6. An electrode-collector assembly according to claim 1, wherein said hydrophobic binder comprises polytetrafluoroethylene.

7. An electrode-collector assembly according to claim 1, wherein said hydrophobic binder comprises polypropylene or polyvinyl chloride.

8. An electrode-collector assembly according to claim 1, wherein the carbon-based divided composition comprises powdered carbon.

9. An electrode-collector assembly according to claim 1, wherein the carbon-based divided composition comprises carbon or graphite fibres.

10. An electrode-collector assembly according to claim 9 wherein the powdered carbon is selected from the group consisting of carbon black and active carbon.

11. An electrode-collector assembly according to claim 1, wherein the carbon-based divided composition of the catalytic layer comprises divided carbon impregnated or associated with a catalyst for the electrochemical reaction concerned.

12. An electrode-collector assembly according to claim 1, wherein the porosity of the support layer and of the active or catalytic layer is substantially between 10 and 80 percent by volume.

13. An electrode-collector assembly according to claim 1, wherein said collector comprises a corrugated impermeable electrically conductive sheet.

14. An electrode-collector assembly according to claim 1, wherein the contact between said collector and said electrode is maintained by pressure.

15. An electrode-collector assembly according to claim 1, wherein the contact between said collector and said electrode is maintained by welding.

16. An electrode-collector assembly according to claim 1, wherein the contact between said collector and said electrode is maintained by means of a conductive glue.

17. An electrode-collector assembly according to claim 1 wherein the overall thickness of said electrode is between about 100 and about 250 microns.

* * * * *

UNITED STATES PATENT AND TRADEMARK OFFICE
CERTIFICATE OF CORRECTION

PATENT NO. : 4,317,867
DATED : 2 March 1982
INVENTOR(S) : Bernard WARSZAWSKI

It is certified that error appears in the above—identified patent and that said Letters Patent is hereby corrected as shown below:

Column 1, line 29: change "outer" to --other--.

Column 1, line 37: after "porous" insert --catalytic--.

Column 4, line 1: after "cohesion" change "," to --;--.

Column 5, line 23: after "of" insert --a--.

Column 5, line 45: after "196,631" insert --for--.

Column 6, line 26: change "pwoder" to --powder--.

Signed and Sealed this

Twenty-fifth Day of May 1982

[SEAL]

Attest:

GERALD J. MOSSINGHOFF

Attesting Officer    Commissioner of Patents and Trademarks